(12) United States Patent
Itoh

(10) Patent No.: US 6,804,017 B1
(45) Date of Patent: *Oct. 12, 2004

(54) INFORMATION PROCESSING DEVICE WITH DETERMINATION FEATURE

(75) Inventor: Shingo Itoh, Komaki (JP)

(73) Assignee: Brother Kogyo Kabushiki Kaisha, Nagoyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/917,197

(22) Filed: Aug. 25, 1997

(30) Foreign Application Priority Data

Aug. 26, 1996 (JP) .............................................. 8-223385

(51) Int. Cl.⁷ .............................. H04N 1/32; H04N 1/00
(52) U.S. Cl. ...................... 358/1.14; 358/437; 358/442; 358/468
(58) Field of Search ................................. 358/468, 442, 358/437, 1.1–1.9, 1.11–1.18; 709/1, 100–108, 200, 201, 229; 710/20, 21; 712/1, 28, 245; 399/38, 75, 76, 77

(56) References Cited

U.S. PATENT DOCUMENTS

| | | | | |
|---|---|---|---|---|
| 4,429,990 A | * | 2/1984 | Tamary | 399/325 |
| 4,454,575 A | * | 6/1984 | Bushaw et al. | 358/468 |
| 4,947,345 A | * | 8/1990 | Paradise et al. | 358/442 |
| 4,991,200 A | * | 2/1991 | Lin | 358/442 |
| 5,021,892 A | * | 6/1991 | Kita et al. | 358/468 |
| 5,377,016 A | * | 12/1994 | Kashiwagi et al. | 358/403 |
| 5,724,555 A | * | 3/1998 | Wadsworth | 395/500 |
| 5,737,092 A | * | 4/1998 | Utsunomiya et al. | 358/468 |
| 5,748,337 A | * | 5/1998 | Minamizawz | 358/468 |
| 5,778,163 A | * | 7/1998 | Terajima | 358/442 |
| 5,790,279 A | * | 8/1998 | Sakellaropoulos | 358/442 |
| 5,790,640 A | * | 8/1998 | Tassa et al. | 358/442 |
| 5,877,782 A | * | 3/1999 | Imai et al. | 347/3 |

* cited by examiner

*Primary Examiner*—King Y. Poon
(74) *Attorney, Agent, or Firm*—Oliff & Berridge, PLC

(57) ABSTRACT

An information processing device that is capable of concurrently processing tasks of a plurality of jobs using time sharing. The plurality of jobs includes a first job and a second job wherein a conflict relating to a resource exists between the first and second jobs. The information processing device includes a job determination unit that determines when the first job is to be executed; a data processing unit that, when the job determination unit determines that the first job is to be executed, performs data processes to indicate that the resource is presently being used.

10 Claims, 4 Drawing Sheets

INFORMATION PROCESSING DEVICE WITH DETERMINATION FEATURE

BACKGROUND OF THE INVENTION

1. Field of the Invention

The present invention relates to an information processing device such as a facsimile device, a personal computer, or a peripheral device connected to a personal computer.

2. Description of the Related Art

Recently, many personal computers are provided with central processing units or processors capable of concurrently processing multi-task functions, that is, tasks of a plurality of jobs using time sharing processes. Such a personal computer is convenient because it can simultaneously execute two different programs concurrently. For example, the personal computer can execute a program to drive a printer in order to print out image data onto a recording sheet and, at the same time, drive a scanner to retrieve an image of a desired document.

SUMMARY OF THE INVENTION

Such a personal computer can be connected with a printer to print out desired images on a variety of different sizes of recording sheets. In this situation, it is necessary for a user to set a variety of settings, such as print direction and size of the print sheets to be used in the printer. However, if the user accidentally or intentionally operates the printer switch before completing the printer settings, then the printer will be driven to perhaps print image data under printing conditions not desired by the user. For example, print data can be printed on an inappropriate size sheet or in an inappropriate font.

Also, while the personal computer having a multi-task function is processing a task of a first job, which requires a certain resource, then sometimes it is inappropriate to interrupt the first task to perform a second task of another job when the second task of the other job requires the same resource. Conventionally, programs for executing multi-task processes have been designed to prevent such problems from occurring. However, these programs are extremely complicated and require a great deal of time and money to produce.

The above-described problems are not limited to personal computers having a multi-task function, but are also relevant to other information processing devices, such as facsimile devices including data processing units, such as CPUs having multi-task function capability.

It is an objective of the present invention to overcome the above-described problems and to provide an information processing device capable of, when a plurality of jobs inappropriate for being concurrently processed are to be processed, preventing, using a simple means, tasks of the plurality of jobs from being processed concurrently.

In order to achieve the above-described objectives, an information processing device according to the present invention is capable of concurrently processing tasks of a plurality of jobs using time sharing methods and includes a job determination unit that determines when a first job is to be executed; and a data processing unit that, when the job determination unit determines that the first job is to be executed, performs data processes to indicate that a resource, which is the subject of a conflict between the first job and a second job, is presently being used.

With this configuration, when the data processing unit is executing the task of the first job, then it performs data processes indicating that the resource common to both the first job and the second job is being used. Therefore, even if the data processing unit receives a command to execute the task of the second job while the data processing unit is executing the task of the first job, the data processing unit will not be able to secure the resource common to both tasks of the first and the second job. In other words, tasks of the second job will be impossible to execute. Therefore, there is no fear that the data processing unit will attempt to concurrently process the first job and the second job, which both compete for the same resource. This is accomplished simply in the present invention by simple data processes by the data processing unit to indicate that the resource common to both the first and the second jobs is being used. Also, the program for executing these data processes has a simple content so that the processors can be easily and inexpensively produced.

According to another aspect of the present invention, the first job is a printer setting job for setting the drive condition of the printer and the second job is a printing job for printing images using the printer. Because the data processing unit will be unable to secure the printer for performing a printing operation, even when it receives a command to execute a printing job while the printer setting job is being performed, the data processing unit will not performed the printing job during the middle of the printer setting job.

According to another aspect of the present invention, the first job is for performing a facsimile transmission or reception using a modem and the second job is either a scanner job for driving the scanner or a printer job for driving the printer. Even if the data processing unit receives a command for a job that requires the scanner while executing a facsimile transmission job, the data processing unit will be unable to secure the scanner and so will not perform the job requiring the scanner. Similarly, even if the data processing unit receives a command for a job that requires the printer while executing a facsimile reception job, the data processing unit will be unable to secure the printer and so will not perform the job requiring the printer. In this way, facsimile transmissions and receptions can be smoothly performed.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
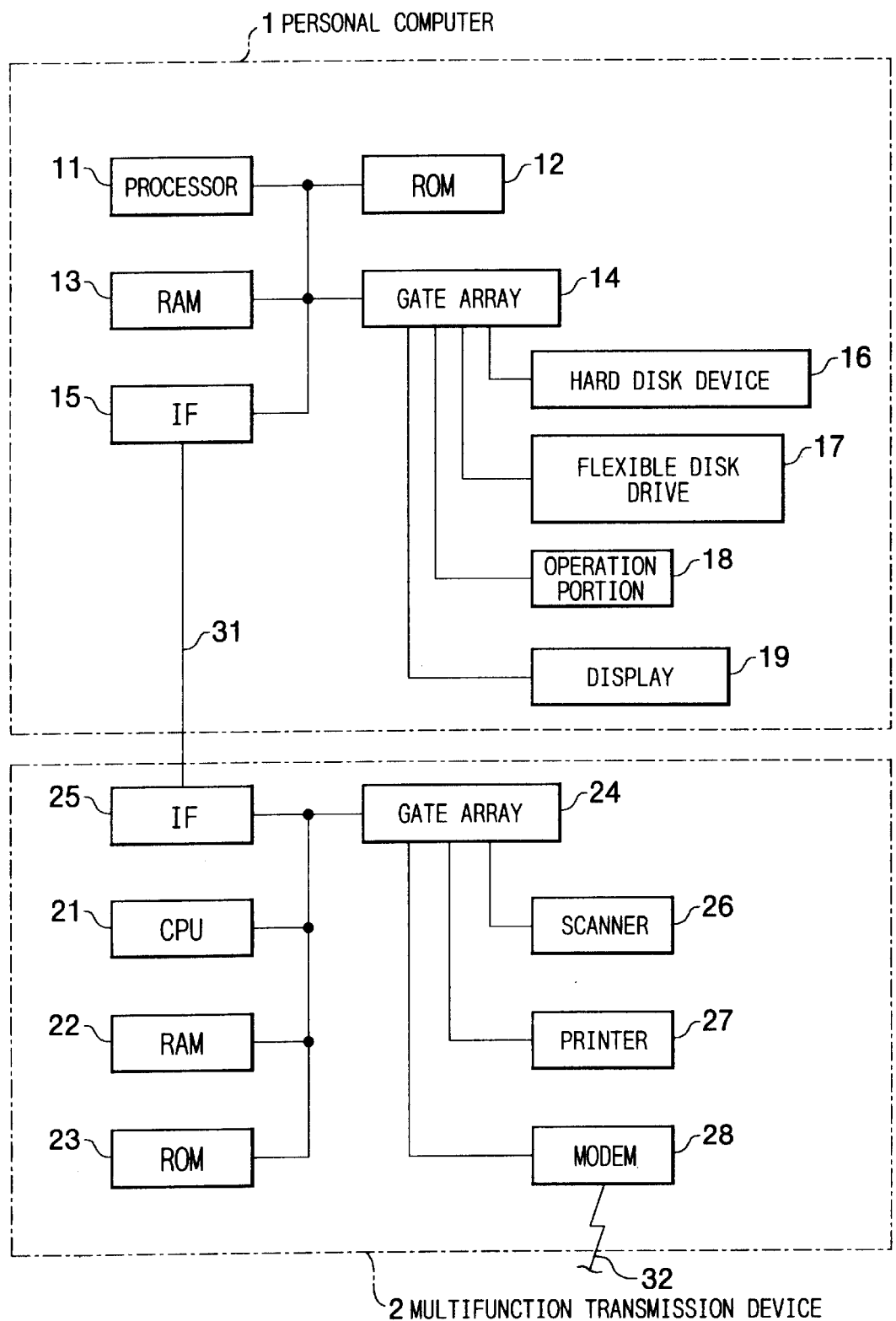
FIG. 1 is a block diagram showing configuration of a multi-function peripheral device according to an embodiment and an information processing device connected to the multi-function peripheral device.

An information processing device according to a preferred embodiment of the present invention will be described while referring to the accompanying drawings wherein like parts and components are designated by the same reference numerals to avoid duplicating description.

FIG. 1 is a block diagram showing configuration of a multi-function peripheral device 2 according to the embodiment and an information processing device 1 connected to the multi-function peripheral device 2.

Here, an explanation will be provided for the multi-function peripheral device 2. The multi-function peripheral device 2 has a plurality of functions including a facsimile transmission function, a printer function, an image scanner function, and a copy function. The multi-function peripheral device 2 includes a CPU 21, a RAM 22, a ROM 23, a gate array 24, an interface 25, a scanner 26, a printer 27, and a modern 28. A bus, that is, including a data bus, an address bus, and a control signal line, connects the CPU 21, the RAM 22, the ROM 23, the gate array 24, and the interface 25.

The CPU 21 controls overall operations of the multi-function peripheral device 2. The RAM 22 and the ROM 23 store programs and data for controlling the various components of the multi-function peripheral device 2. The gate array 24 functions as an interface between the CPU 21 and the image scanner 26, the printer 27, and the modem 28. The interface 25 is connected to an interface 15 of the personal computer 1 via a cable 31. The interface 25 controls transmission and reception of data between the personal computer 1 and the multi-function peripheral device 2 based on a predetermined standard, such as RS-232C, Centronics, or both. The image scanner 26 is capable of retrieving images from a document and converting the images into an image signal. The printer 27 is capable of printing out desired image data onto a desired recording sheet. The modem 28 is capable of executing facsimile transmission. During a facsimile transmission, the modem 28 modulates transmission data and demodulates reception data. The modem 28 is connected to a transmission circuit 32 such as a telephone line.

Next, an explanation will be provided for the personal computer 1. The personal computer 1 includes the interface 15 described above, a processor 11, a ROM 12, a RAM 13, a gate array 14, a hard disk device 16, a floppy disk drive 17, an operation portion 18, and a display 19. A bus line, that is, including a data bus, an address bus, and a control signal line, connects the processor 11, the ROM 12, the RAM 13, the gate array 14, and the interface 15.

The processor 11 performs information processes based on programs such as a variety of application software and operation systems installed in the hard disk device 16. The ROM 12 and the RAM 13 store a variety of data and programs. The gate array 14 serves as an interface between the processor 11 and the hard disk device 16, the floppy disk drive 17, the operation portion 18, and the display 19. The hard disk device 16 stores a variety of application software programs. The floppy disk drive 17 is capable of retrieving information from a floppy disk. The operation portion 18 includes a plurality of operation switches such as a ten key pad. The display 19 is configured by a cathode ray tube (CRT) or a liquid crystal display (LCD).

The hard disk device 16 of the personal computer 1 is installed with a variety of application software for executing various functions of the multi-function peripheral device 2 and the personal computer 1. For example, the hard disk device 16 is installed with application software for executing facsimile transmission and reception using the modem 28 of the multi-function peripheral device 2, for using the printer 27 to print out text or images produced in the personal computer 1, and for storing data from an image signal of images retrieved by the image scanner 26 in the personal computer 1.

The CPU 21 of the multi-function peripheral device 2 is capable of executing multi-task processes using time sharing based on a program stored in the ROM 23. The ROM 23 stores programs so that the multi-function peripheral device 2 can itself operate the image scanner 26 and the printer 27, that is, independently from control of the personal computer 1, and also so that the multi-function peripheral device 2 can control operation of each component of the multi-function peripheral device 2 in accordance with commands from the personal computer 1. In addition, the ROM 23 stores a program executed by the CPU 21 so that the CPU 21 performs data processes to indicate that a resource relevant to both a first and a second job is being used while the CPU 21 is executing a task of the first job. This program will be described in greater detail below.

A "job" is a series of process operations performed based on a command that is output to the multi-function device in accordance with a user operation. A "task" is one individual process step in the series of process operations that make up a job, in particular, to a process step that relates to a particular resource or to a process step between two different resources.

The CPU 21 executes printer setting processes for setting drive conditions relating to the printer 27, such as drive conditions appropriate for a certain size recording sheet and a certain print direction. If the user attempts to print out image data by driving the printer 27 while the CPU 21 is executing the printer setting processes, then problems can occur if the user has not yet completed setting processes for the printer 27. Therefore, whenever the printer setting processes for setting drive conditions of the printer 27 is performed by the CPU 21, the CPU 21 executes data processes, based on programs stored in the ROM 23, to indicate that the printer 27 is being driven to print. The data processes for indicating that the printer 27 is presently being driven to print are performed, for example, by the CPU 21 setting an event flag to indicate that the printer 27 is presently being driven to print.

The multi-function peripheral device 2 can be controlled by the personal computer 1 to use the modem 28 to execute facsimile transmissions and receptions. However, sometimes the user will accidentally or intentionally operate switches on the personal computer 1 for using the printer 27, the image scanner 26, or both during a facsimile transmission or a facsimile reception. However, because the printer 27 is sometimes used for facsimile transmission processes, it is undesirable for the printer 27 to be driven by itself for printing out text and the like during a facsimile transmission. Similarly, because the image scanner 26 sometimes is used for facsimile reception processes, it is undesirable for the image scanner 26 to be driven by itself for scanning images during a facsimile reception. According to the present invention, the CPU 21 executes data processes indicating that the printer 27 is being driven when the CPU 21 is executing facsimile transmission processes using the modem 28. Also, the CPU 21 executes data processes indicating that the image scanner 26 is being driven when the CPU 21 is executing facsimile reception processes using the modem 28. Again, data processes for indicating that the printer 27, the image scanner 26, or both are presently being driven is performed by the CPU 21 setting event flags indicating that the printer 27, the image scanner 26, or both are presently being driven.

Figure 2:
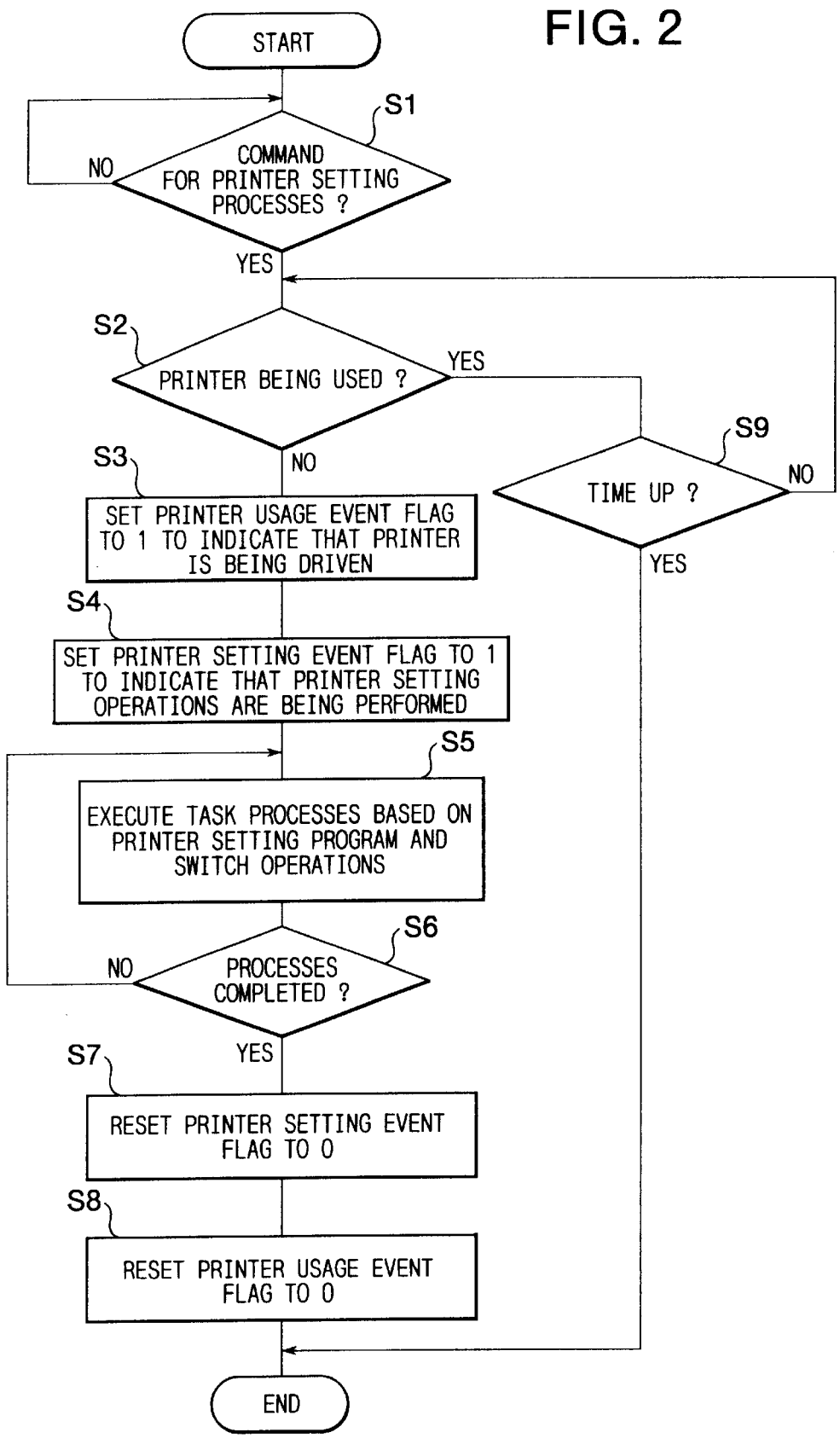
FIG. 2 is a flowchart representing operations performed in the multi-function peripheral device of FIG. 1 to prevent a printer from being used to print out text during a printer setting process.

Next, while referring to the flowchart shown in FIG. 2, an explanation will be provided for operations performed by the multi-function peripheral device 2 when a printer setting process is performed. First, it is determined whether or not the multi-function peripheral device 2 has received a command from the personal computer 1 indicating that printer setting operations be executed for setting printing conditions, such as print direction, of the printer 27. If so (S1:YES), then the CPU 21 in S2 determines whether or not the printer 27 is presently being used. The CPU 21 determines whether or not the printer 27 is presently being used by referring to a printer usage event flag provided for determining whether or not the printer 27 is presently used. If the printer 27 is presently being used (S2:YES), then the multi-function peripheral device 2 transmits to the multi-function peripheral device 2 an appropriate control command indicating that the personal computer 1 should wait before starting printer setting processes. As a result, the personal computer 1 waits until the printer 27 is freed up (S2:NO) or until a predetermined duration of time elapses (S9:YES). When the predetermined duration of time elapses (S9:YES), then this program is ended.

On the other hand, when the CPU 21 determines that the printer 27 is not presently being used (S2:NO), then in S3, the CPU 21 sets to one the printer usage event flag for determining that the printer 27 is presently being driven to print. When the printer usage event flag is set to one, the CPU 21 determines that the printer 27 is presently being used to print regardless of whether or not the printer 27 is actually being used to print. In this way, during printer setting processes, the CPU 21 can secure a resource necessary for printer driving processes. Next, the CPU 21 in S4 sets to one a printer setting event flag for determining that processes are being performed for setting the setting condition of the printer 27. The printer setting event flag is for determining whether or not the CPU 21 is performing printer setting processes. When the printer setting event flag is set to one, then resources for performing printer setting processes, such as the printer 27, are secured.

After these two event flags are set to one, then in S5, the CPU 21 executes task processes based on switch operations by the user and based on the printer setting program installed, for example, in the hard disk device 16 of the personal computer 1. The printer setting program is serially retrieved by the processor 11, whereupon data is transmitted to the multi-function peripheral device 2 according to this printer setting program. The CPU 21 then executes printer setting processes based on the printer setting program.

When the printer setting processes have been completed (S6:YES), then in S7, the CPU 21 resets to zero the printer setting event flag, thereby showing that the printer setting processes have been completed. When the printer setting event flag is reset to zero in this way, resources, such as the printer 27, which are involved in printer setting operations are freed up. Next in S8, the CPU 21 resets the printer usage event flag to zero. When the printer usage event flag is reset to zero in this way, the CPU 21 will determine that no processes are being performed that use the printer 27 so that the printer 27 is not being used.

According to this series of operations, from when the printer usage event flag is set to one in S3 until when the printer usage event flag is reset to zero in S8, the printer usage event flag will indicate that the printer 27 is presently being driven for printing operations. This is the same condition as if a resource necessary for the printer 27 to print out desired image data is not available for use.

Accordingly, when the multi-function peripheral device 2 receives a command from the personal computer 1 to drive the printer 27 during this time period, the CPU 21 will not accept the command. As a result, the printer 27 will not be erroneously driven while processes for setting the printer 27 are being performed.

Figure 3:
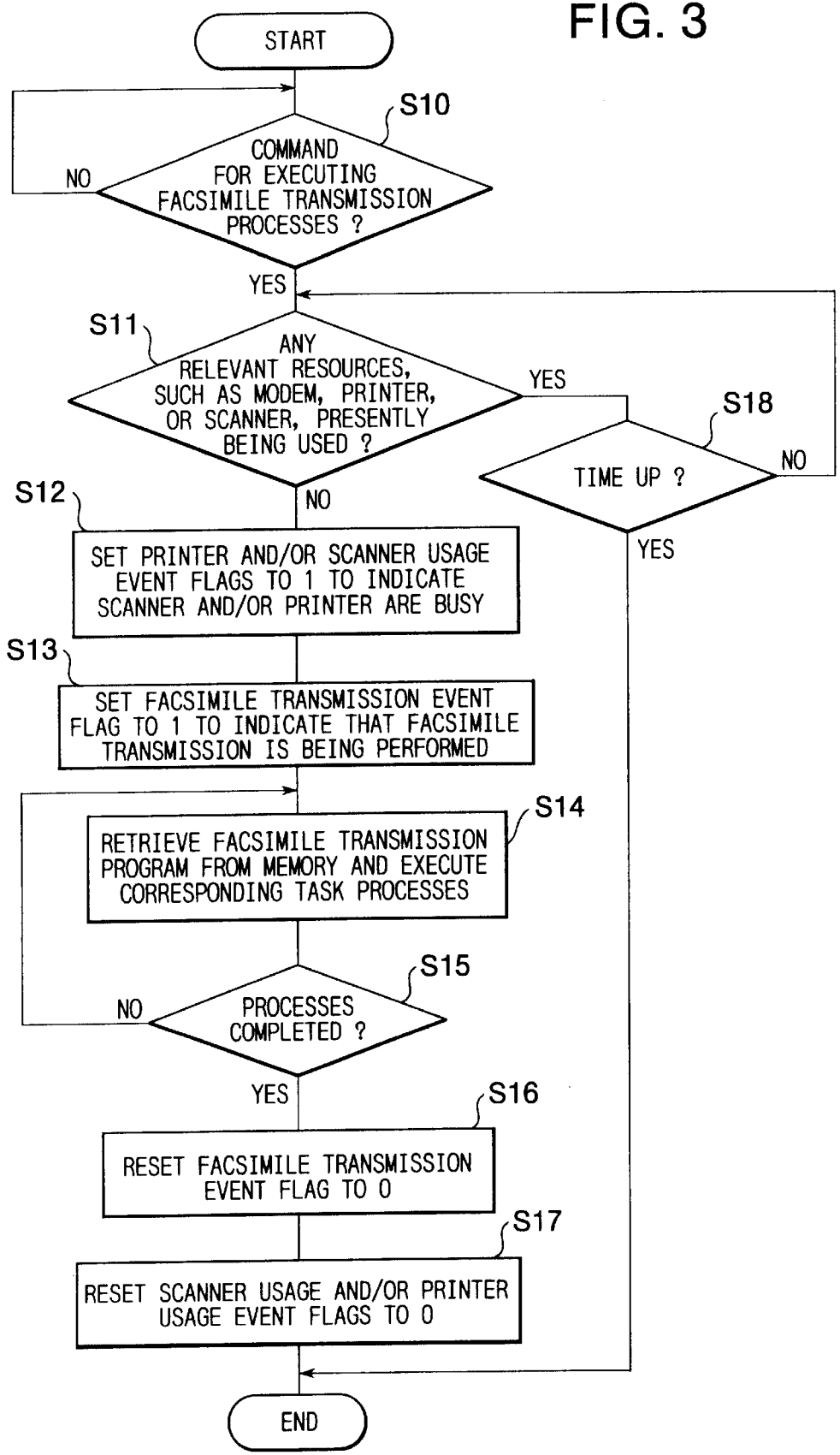
FIG. 3 is a flowchart representing operations performed in the multi-function peripheral device of FIG. 1 to prevent a scanner, the printer, or both from being used during a facsimile transmission process.

Next, while referring to the flowchart shown in FIG. 3, an explanation will be provided for operations for executing facsimile transmission using the multi-function peripheral device 2.

First in S10, it is determined whether or not a predetermined operation was performed at the operation portion 18 of the personal computer 1 so that the multi-function peripheral device 2 has received from the personal computer 1 an execution command for executing facsimile transmission processes. In the present specification, facsimile transmission is used as a generic expression to refer both to transmission of facsimile data from the multifunction transmission device 32 to a remote device and to reception of facsimile data from a remote device by the multifunction transmission device 32. If an execution command has been received (S10:YES), then in S11, the CPU 21 determines whether or not predetermined resources necessary for facsimile transmission, that is, the modem 28 and printer 27 for reception of incoming facsimile data, and modem 28 and the image scanner 26 for transmission of facsimile data, are presently being used. In other words, in S11, the CPU 21 determines whether or not the modem 28 and printer 27 are being used when the execution command received in S10 is for executing reception of incoming facsimile data and determines whether or not the modem 28 and the image scanner 26 are being used when the execution command is for executing transmission of facsimile data. When the CPU 21 determines that required units are not presently being used (S11:NO), then in S12, the CPU 21 sets to one a printer usage event flag during reception and a scanner usage event flag during transmission. When necessary ones of the two event flags are set to one, this will be indicate the same condition as though the printer 27 and/or the image scanner 26 are actually being used so that the printer 27 and the image scanner 26 are secured as a resource. Next in S13, the CPU 21 sets to one a facsimile usage event flag. When the facsimile usage event flag is set to one in this way, the CPU 21 secures resources necessary for facsimile transmission.

After these event flags are set to one in S13, then in S14 the CPU 21 executes a task process based on the facsimile transmission program. Once the facsimile transmission routine is completed (S15:YES), then in S16, the CPU 21 resets to zero the facsimile usage event flag. As a result, resources required for facsimile transmission are freed up.

Then in S17, the CPU 21 resets to zero the printer usage event flag and/or the scanner usage event flag. As a result, the printer 27 and/or the image scanner 26 are freed up to be used as necessary as resources, for example, for copying, printing, or further facsimile transmissions.

With this series of operations, from when required ones of the two event flags are set to one in S12 until when required ones of the two event flags are reset to zero in S17, then the flag condition will be the same as though the CPU 21 were using the printer 27 and/or the image scanner 26. Accordingly, even if the multi-function peripheral device 2 receives a command from the personal computer 1 to drive the printer 27, the image scanner 26, or both to perform another job, the CPU 21 will be unable to secure the printer 27 and/or the image scanner 26 as a resource for the other job. Therefore, the CPU 21 will be unable to drive the printer 27 and/or the image scanner 26 in accordance with the command. As a result, the multi-function peripheral device 2 will be able to continue to appropriately perform facsimile transmission processes.

Figure 4:
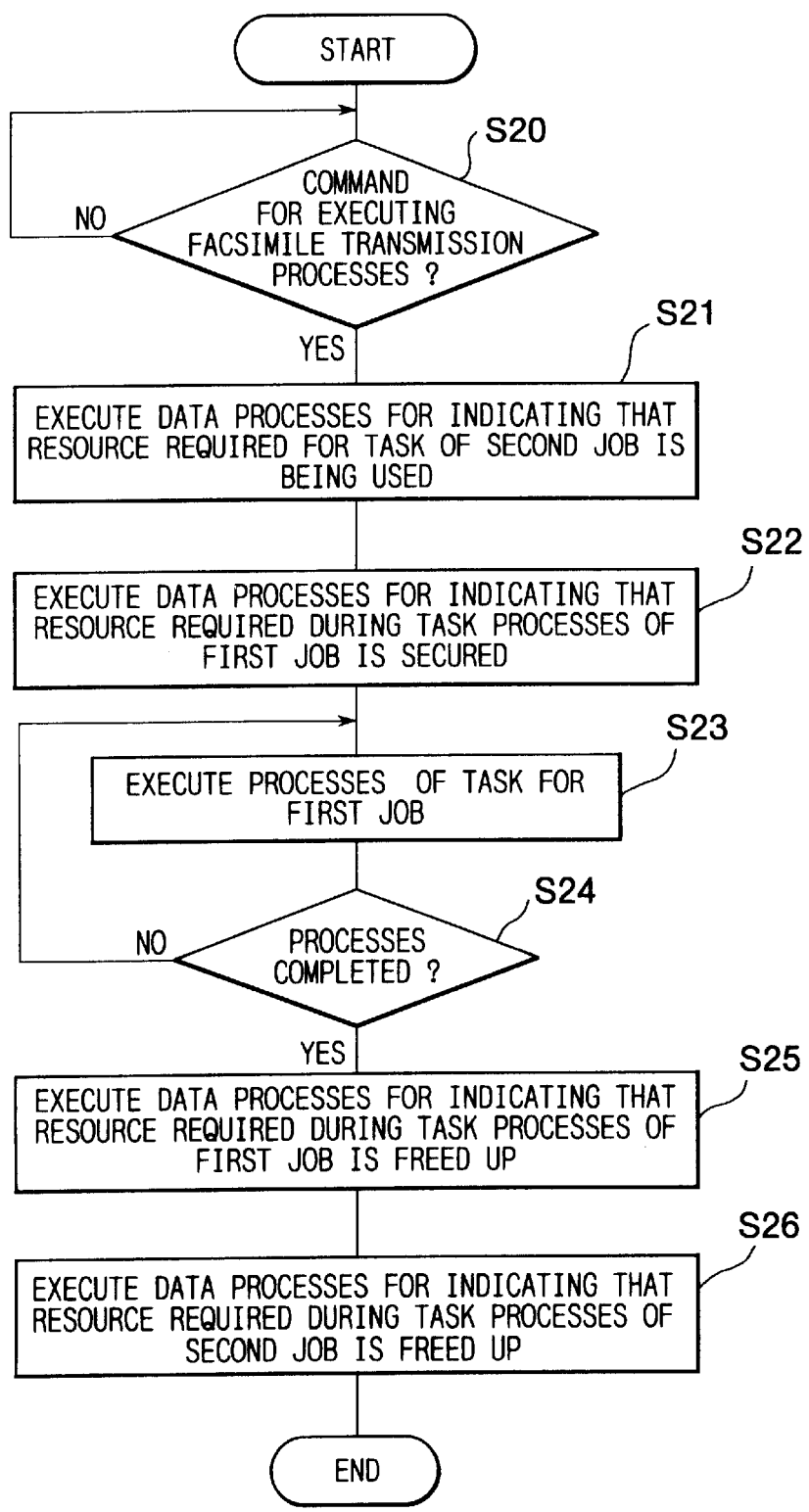
FIG. 4 is a flowchart summarizing operations performed according to the present invention.

Next, a summary of operations performed in the multi-function peripheral device 2 will be described while referring to the flowchart shown in FIG. 4. First in S20, whether or not the CPU 21 receives a command to execute processes for the first job is determined. If so (S20:YES), then in S21, the CPU 21 executes data processes to indicate that the resource used for a task for the second job, which competes for resources of the first job, or otherwise has resources in common with the first job, is being used. Next in S22, the CPU 21 executes data processes for securing resources used in the task of the first job. In S23, the CPU 21 executes the task for the first job. When the task processes of the first job are completed (S24:YES), then in S25, the CPU 21 executes data processes indicating that the resource used in the task of the first job has been freed up. Next in S26, the CPU 21 executes data processes for indicating that the resource used during the task of the second job has been freed up. During the period between the start of S21 and the end of S26, the resource required to perform the task of the second job will be busy. Therefore, the CPU 21 will not process the task of the second job concurrently with the task of the first job.

While the invention has been described in detail with reference to specific embodiments thereof, it would be apparent to those skilled in the art that various changes and modifications may be made therein without departing from the spirit of the invention, the scope of which is defined by the attached claims.

For example, the embodiments describe situations wherein when a task of a first job, such as facsimile transmission processes, is started, then the CPU 21 will not execute a task of a second job, such as printer drive or scanner drive, when the first job and the second job compete for the same resource. However, the present invention can be applied to a device configured so that a task A of a first job issues a ENQ macro when processes for the task A are started in the CPU 21. In this case, from when the ENQ macro for the task A has been issued until the resource is freed up by the task A issuing a DEQ macro, other ENQ macros for other tasks requesting use of the same resource required for the task A will be ignored. For example, even if a task B of a second job issues an ENQ macro for the same resource required for the task A, the task B can be made to wait. By using ENQ-DEQ type program control, tasks of a second job, which competes for task resources needed to perform the first job, can be prevented from being executed.

The embodiments describe examples of jobs having a conflict relating to resources. That is to say, the embodiments describe examples of when performing a second job before a first job is completed results in the first job, the second job, or both not being properly performed. Because a conflict relating to the printer exists between the printer setting job and the printer job, processes for driving the printer to print are prevented when processes for setting the printer are being performed. Also, because a conflict relating to the scanner and the printer exists between facsimile transmission, that is, reception and transmission, and jobs such as copying, which require the scanner, and printing, which require the printer, processes for driving the scanner, the printer, or both are prevented when facsimile transmission is being executed. However, the present invention is not limited to these examples. The present invention can be applied to a variety of situations, wherein concurrently processing tasks of a plurality of jobs can cause problems because the plurality of jobs have a resource in common. Accordingly, the task processes for the first job and the task processes for the second job are not limited to the above-described examples.

Further, the embodiment described the present invention applied to a multi-function peripheral device connected to a personal computer. However, the present invention can be applied to a variety of different information processing devices other than a multi-function peripheral device. For example, the present invention can be applied to a personal computer or to a facsimile device.

Also, the components and their configuration described in the embodiments can be modified in a variety of ways without adversely affecting the good effects of the present invention.

What is claimed is:

1. An information processing device comprising:

a plurality of resources;

a processor adapted to process at least two jobs associated with at least one resource, said processor able to simultaneously process tasks of a plurality of jobs that require the at least one resource and jobs that require resources not associated with the at least two jobs;

a command determination unit that determines when a command is received that commands the processor to process one of the at least two jobs; and a resource use indication unit that, when the command determination unit determines that a command is received to process the one of the at least two jobs, indicates that the at least one resource and other resources relevant to the one of the at least two jobs being commanded is being used, regardless of whether the at least one resource and the other resources are being used or not, thereby preventing another of the at least two jobs from being processed while the one of the at least two jobs being commanded is being processed, jobs that require resources not associated with the at least two jobs are not prevented from being processed, wherein a job is a series of process operations performed based on a single command that corresponds to a single user operation and a task is one individual process step in the series of process operations that make up a job, each single user operation generating only a single command that starts only a single job;

a flag setting unit that, when the command determination unit determines that a command is received to process the one of the at least two jobs, sets a first flag to indicate that the at least one resource is being used, regardless of whether the at least one resource is being used or not, in order to prevent another of the at least two jobs from being processed while the one of the at least two jobs is being processed, and sets a second flag to indicate that the one of the at least two jobs is being processed.

2. An image processing device comprising:

a modem that performs facsimile transmission;

a scanner that retrieves images from an original document;

a print unit that prints out images;

a job task determination unit that determines when the scanner is to be used to retrieve images for facsimile transmission using the modem; and a data processing unit that simultaneously processes a plurality of jobs using multi-task processes, the plurality of jobs including a particular job including a printer setting job for setting drive conditions of the print unit, wherein the data processing unit, when the job task determination unit determines that the scanner is to be used for facsimile transmission, does not process other jobs with tasks that require the scanner and any other resource relevant to facsimile transmission, and that processes, as needed, jobs with tasks that require the print unit but not the scanner and any other resource relevant to facsimile transmission, wherein a job is a series of process operations performed based on a single command that corresponds to a single user operation and a task is one individual process step in the series of process operations that make up a job, each single user operation generating only a single command that starts only a single job, wherein:

the other jobs with tasks that require a resource required for a particular task of the particular job include a printer print drive job for printing out data using the print unit, and the data processing unit when processing a task of the printer setting job, performs data processes indicating that the print unit is presently being used to print.

3. An information processing device as claimed in claim 2, wherein:

the other jobs with tasks that require a resource required for the particular task of the particular job include processes for driving the scanner to retrieve an image; and the data processing unit, when processing a task of the facsimile transmission job, performs data processes indicating that the scanner is presently being used to retrieve an image from an original.

4. An information processing device as claimed in claim 3, wherein the data processing unit secures the resource for use in the task of the particular job after performing data processes indicating that the resource is presently being used.

5. An information processing device as claimed in claim 4, wherein the data processing unit performs the tasks of the particular job after securing the resource for use in the particular job.

6. An information processing device as claimed in claim 5, wherein the data processing unit performs processes to free up the resource for use in tasks of the other jobs with tasks that require a resource required for the particular task of the particular job after performing the particular job.

7. An information processing device as claimed in claim 2, wherein the data processing unit determines if the resource is presently being used and waits until the resource is available before performing data processes to indicate that the resource is presently being used.

8. An information processing device as claimed in claim 7, wherein the resource includes a plurality of resources, the data processing unit determining whether any of the plurality of resources is presently being used and waiting until all the plurality of resources are available before performing data processes to indicate that at least one of the plurality of resources is presently being used.

9. An image processing device comprising:

a modem that performs facsimile transmission;

a scanner that retrieves images from an original document, a print unit that prints out images;

a job task determination unit that determines when the print unit is to be used to print images received in a facsimile transmission using the modem; and a data processing unit that simultaneously processes a plurality of jobs using multi-task processes, the plurality of jobs including a particular job including a printer setting job for setting drive conditions of the print unit, wherein the data processing unit, when the job task determination unit determines that the print unit is to be used to print images received in a facsimile reception, does not process other jobs with tasks that require the print unit and any other resources relevant to facsimile reception, and that processes, as needed, jobs with tasks that require the scanner but not any resources relevant to facsimile reception, wherein a job is a series of process operations performed based on a single command that corresponds to a single user operation and a task is one individual process step in a series of process operations that make up a job, each single user operation generating only a single command that starts only a single job, wherein:

the other jobs with tasks that require a resource required for a particular task of the particular job include a printer print drive job for printing out data using the print unit, and the data processing unit when processing a task of the printer setting job, performs data processes indicating that the print unit is presently being used to print.

10. An information processing device as claimed in claim 9, wherein:

the other jobs with tasks that require a resource for the particular task of the particular job include processes for driving the printer; and the data processing unit, when processing a task of the facsimile reception job, performs data processes indicating that the printer is presently being used to print.

* * * * *